United States Patent
Fu

(10) Patent No.: US 7,808,198 B2
(45) Date of Patent: Oct. 5, 2010

(54) ROBUST TIMED SWITCHING CONTROL WITH STATE MEASUREMENT

(75) Inventor: Jyun-Horng Fu, Linden Creek Ct., VA (US)

(73) Assignee: Lockheed Martin Corporation, Bethesda, MD (US)

(*) Notice: Subject to any disclaimer, the term of this patent is extended or adjusted under 35 U.S.C. 154(b) by 394 days.

(21) Appl. No.: 12/119,991

(22) Filed: May 13, 2008

(65) Prior Publication Data

US 2009/0315499 A1    Dec. 24, 2009

Related U.S. Application Data

(60) Provisional application No. 60/938,064, filed on May 15, 2007.

(51) Int. Cl.
*G05B 13/02* (2006.01)
*G05B 11/01* (2006.01)

(52) U.S. Cl. ............. 318/561; 318/560; 318/568.1; 318/568.11; 318/568.2; 318/615; 700/245; 700/253; 700/249; 901/1

(58) Field of Classification Search ......... 318/561, 318/568.1, 568.11, 615; 700/245, 253, 249; 901/1
See application file for complete search history.

(56) References Cited

U.S. PATENT DOCUMENTS

| | | | | | |
|---|---|---|---|---|---|
| 4,603,286 | A | * | 7/1986 | Sakano | 318/615 |
| 4,937,759 | A | * | 6/1990 | Vold | 700/262 |
| 4,975,856 | A | * | 12/1990 | Vold et al. | 700/263 |
| 5,239,246 | A | * | 8/1993 | Kim | 318/568.11 |
| 5,872,417 | A | * | 2/1999 | Sugaya | 310/323.17 |
| 5,933,352 | A | * | 8/1999 | Salut | 700/174 |
| 6,036,162 | A | * | 3/2000 | Hayashi | 248/550 |
| 6,611,119 | B2 | * | 8/2003 | Fu | 318/560 |
| 6,697,683 | B1 | * | 2/2004 | Tisue | 700/56 |

* cited by examiner

*Primary Examiner*—Rita Leykin
(74) *Attorney, Agent, or Firm*—DeMont & Breyer, LLC

(57) ABSTRACT

A mechanism for empirically deriving the values of the damping ratio and frequency of the mechanism driven by a servo-controlled control system is disclosed. In accordance with the illustrative embodiment, the values of the damping ratio and frequency are continually re-generated based on empirical data derived from sensor feedback of the maximum-amplitude switch and the linear second-order servo. Because the values of the damping ratio and frequency are generated from empirical data, it is not necessary that they be known, and because the values of the damping ratio and frequency are continually re-generated, variances in their values are continually noticed and compensated for.

16 Claims, 4 Drawing Sheets

ROBUST TIMED SWITCHING CONTROL WITH STATE MEASUREMENT

CROSS REFERENCE TO RELATED APPLICATIONS

The application claims the benefit of U.S. Provisional Patent Application 60/938,064, filed May 15, 2007, entitled "Robust Timed Switching Control with State Measurement," which is also incorporated by reference.

FIELD OF THE INVENTION

The present invention relates to control systems in general, and, more particularly, to servo controllers.

BACKGROUND OF THE INVENTION

FIG. 1 depicts a block diagram of control system 100 in the prior art as taught, for example, by J. H. Fu, U.S. Pat. No. 6,611,119, which is incorporated by reference. Control system 100 comprises: three-degree-of-freedom mechanism 101 and degree-of-freedom controllers 102-1, 102-2, and 102-3, interrelated as shown.

Three-degree-of-freedom mechanism is a mechanical device (e.g., robotic manipulator, gun turret, antenna dish, hard-disk drive, etc.) that comprises three independent degrees of freedom, $x_1(t)$, $x_2(t)$, and $x_3(t)$. Each of the degrees of freedom is driven by one of degree-of-freedom controller 102-i, wherein i ∈ {1, 2, 3}. Degree-of-freedom controller 102-i takes as input a time-varying signal $A_i(t)$ and drives the corresponding degree of freedom $x_i(t)$ of mechanism 101 to that value.

FIG. 2 depicts a block diagram of degree-of-freedom controller 102-i, as depicted in FIG. 1. Degree-of-freedom controller 102-i is an open-loop controller that comprises: maximum-amplitude switch 201-i and linear second-order servo 202-i, which drives one degree of freedom of three-degree-of-freedom mechanism 101 as shown.

Maximum-amplitude switch 201-i takes as input:
i. a signal $A_i(t)$, which is a time-varying desired setting degree of freedom $x_i(t)$ of mechanism 101,
ii. a signal $p_i$, which is the damping ratio of degree of freedom i of mechanism 101, and
iii. a signal $w_i$, which is the frequency of degree of freedom i of mechanism 101. Maximum-amplitude switch 201-i takes these three values and generates a time-varying output signal $a_i(t)$, which is the input to linear-second-order servo 202-i. It will be clear to those skilled in the art how to generate $a_i(t)$ given $A_i(t)$, $p_i$, and $w_i$. See, for example, J. H. Fu, U.S. Pat. No. 6,611,119.

Linear second-order servo 102 receives $a_i(t)$ and generates a time-varying output $x_i(t)$, drives one degree of freedom of three-degree-of-freedom mechanism 101, in well-known fashion.

In the prior art, the values of $p_i$ and $w_i$ are assumed to be known parameters of mechanism 101 and to be constant. In many situations, however, the values of $p_i$ and $w_i$ are not known, and in some situations, the values of $p_i$ and $w_i$ vary, even if somewhat slightly. For these reasons, the need exists for a solution when either the values of $p_i$ and $w_i$ are not known or the values vary or both.

SUMMARY OF THE INVENTION

The present invention provides a solution to the problem when the values of $p_i$ and $w_i$ are not known or the values vary or both. In accordance with the illustrative embodiment, the values of $p_i$ and $w_i$ are continually re-generated based on empirical data derived from sensor feedback of the maximum-amplitude switch and the linear second-order servo. Because the values of $p_i$ and $w_i$ are generated from empirical data, it is not necessary that they be known, and because the values of $p_i$ and $w_i$ are continually re-generated, variances in their values are continually noticed and compensated for.

It will be clear to those skilled in the art, after reading this disclosure, how to make and use embodiments of the present invention that apply to rotary mechanisms that can be modeled as second-order linear control systems. Furthermore, it will be clear to those skilled in the art, after reading this disclosure, how to make and use embodiments of the present invention to nonlinear mechanisms that, via standard coordinate transformation techniques (e.g., feedback linearization techniques in non-linear control theory, etc.) can be modeled as linear or non-linear control systems of higher dimensions.

The illustrative embodiment comprises: a linear second-order servo that drives one degree of freedom of a mechanism; a sensor for ascertaining the velocity and position of the degree of freedom of the mechanism at instant $s_0$, wherein the velocity at instant $s_0$ is represented by $y_0$ and wherein the position at instant $s_0$ is represented by $x_0$; a real-time system parameter identifier for generating the damping ratio $p_i$ and frequency $\omega_1$ of the one degree of freedom of the mechanism based on $x_0$ and $y_0$; and a maximum-amplitude switch for controlling the linear second-order servo based on the damping ratio $p_i$ and frequency $\omega_i$ of the one degree of freedom of the mechanism.

DETAILED DESCRIPTION

Figure 1:
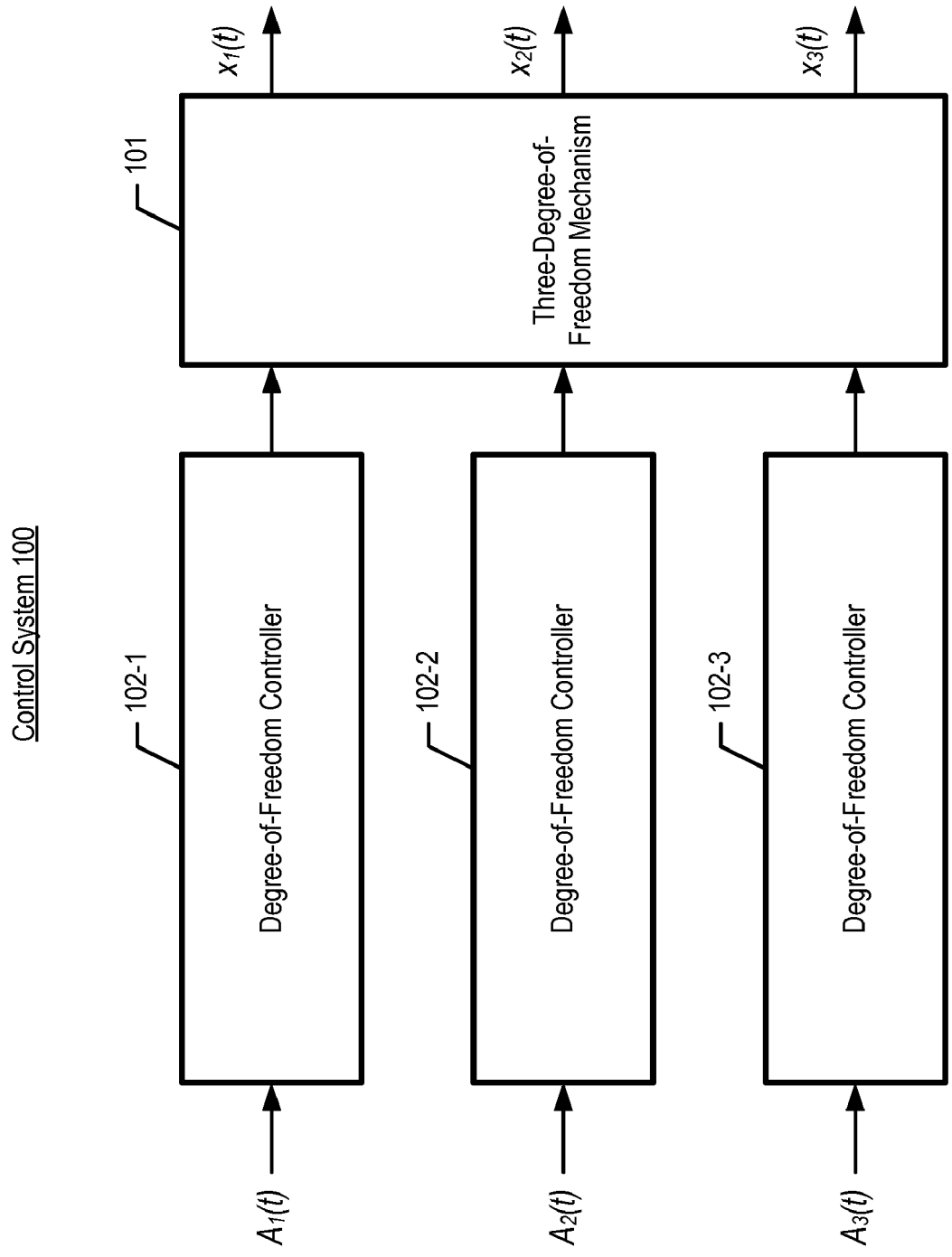
FIG. 1 depicts a block diagram of control system 100 in the prior art as taught, for example, by J. H. Fu, U.S. Pat. No. 6,611,119, which is incorporated by reference.
Figure 2:
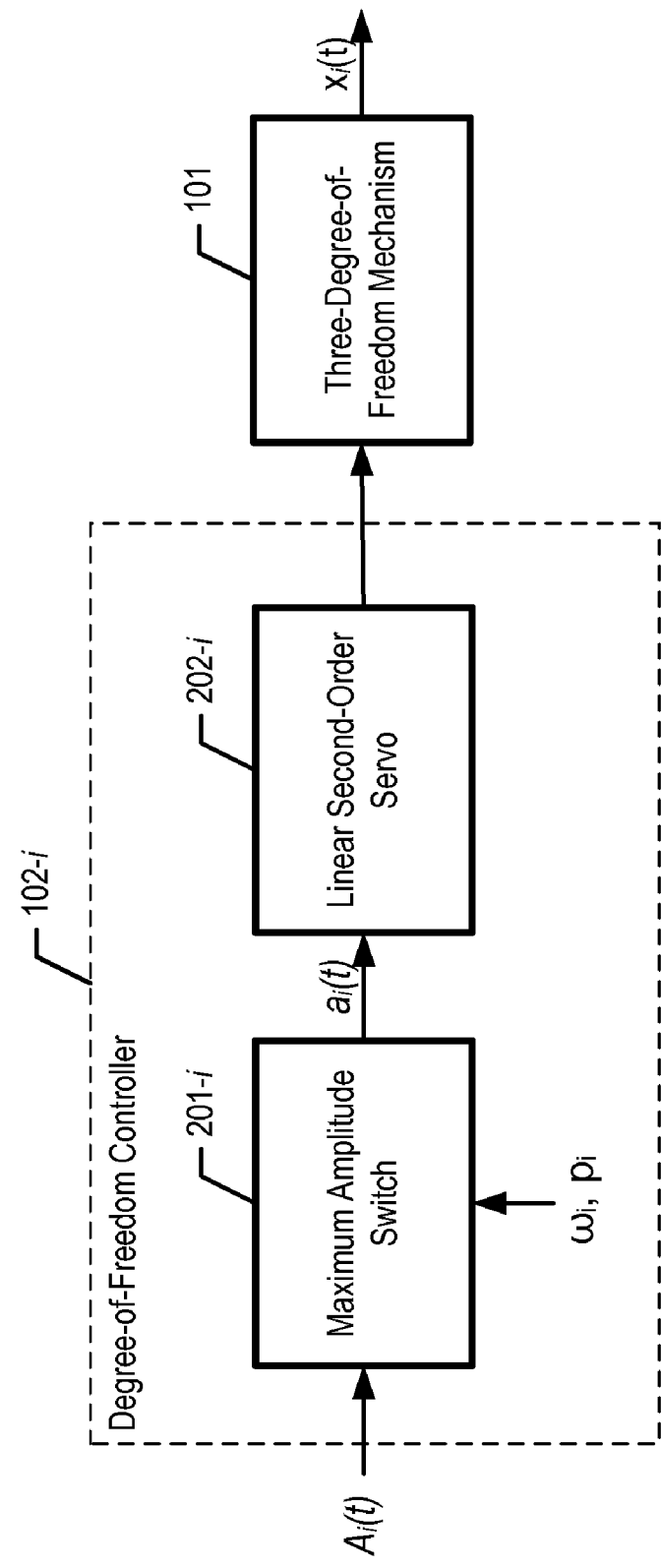
FIG. 2 depicts a block diagram of degree-of-freedom controller 102-i, as depicted in FIG. 1.
Figure 3:
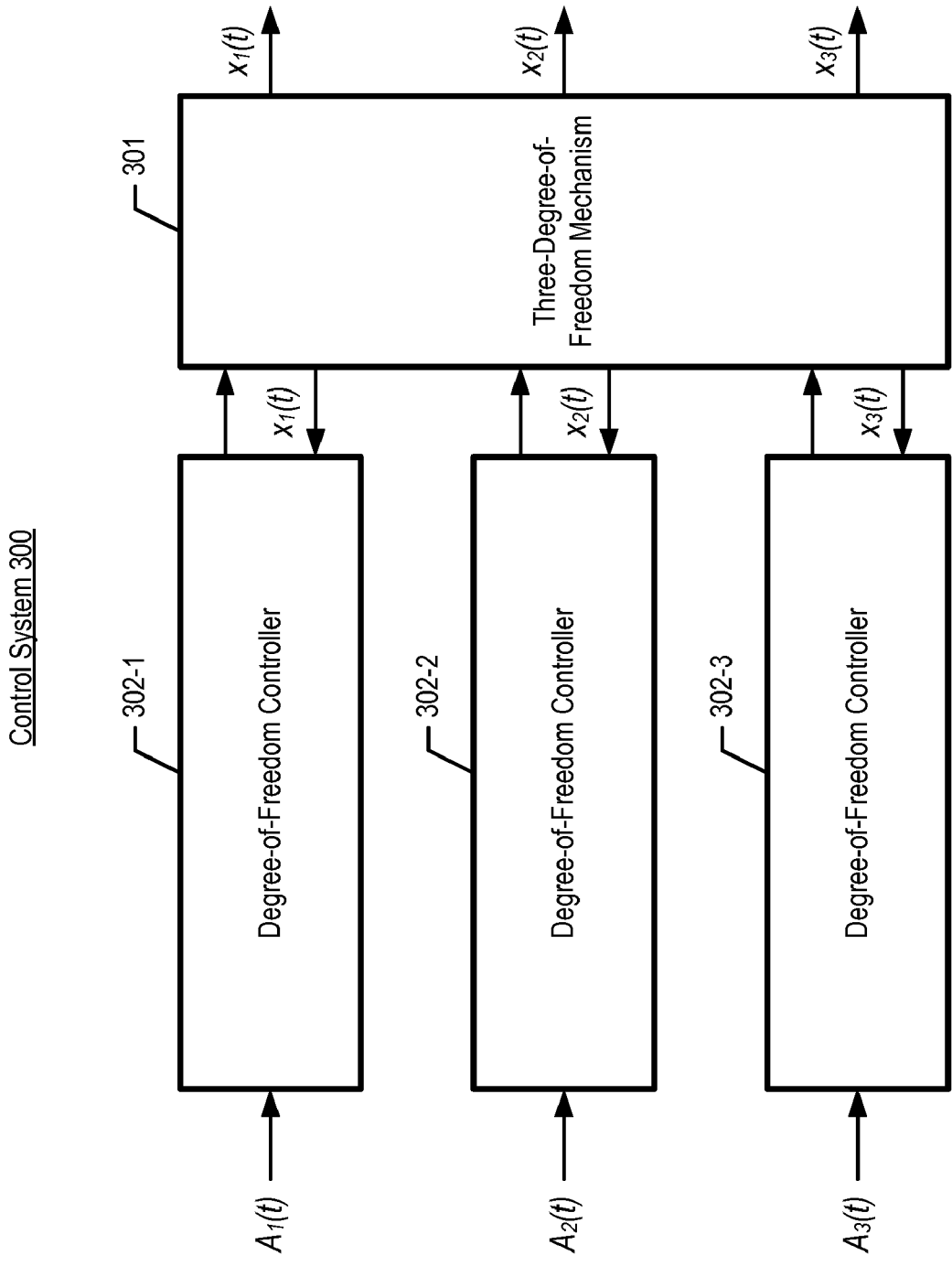
FIG. 3 depicts a block diagram of control system 300 in accordance with the illustrative embodiment of the present invention.

FIG. 3 depicts a block diagram of control system 300 in accordance with the illustrative embodiment of the present invention. Control system 300 comprises: three-degree-of-freedom mechanism 301 and degree-of-freedom controllers 302-1, 302-2, and 302-3, interrelated as shown.

Three-degree-of-freedom mechanism is a mechanical device (e.g., robotic manipulator, gun turret, hard-disk drive, etc.) that comprises three independent degrees of freedom, $x_1(t)$, $x_2(t)$, and $x_3(t)$. Each of the degrees of freedom is driven by one of degree-of-freedom controller 302-i, wherein i ∈ {1, 2, 3}. It will be clear to those skilled in the art, after reading this specification, how to make and use alternative embodiments of the present invention in which mechanical device 301 comprises any number of degrees of freedom (e.g., 1 degree of freedom, 2 degrees of freedom, 4 degrees of freedom, 5 degrees of freedom, 6 degrees of freedom, etc.). Degree-of-freedom controller 302-i takes as input a time-varying signal $A_i(t)$ and the corresponding degree of freedom $x_i(t)$ as feedback and drives the corresponding degree of freedom $x_i(t)$ of mechanism 301 to $A_i(t)$.

Figure 4:
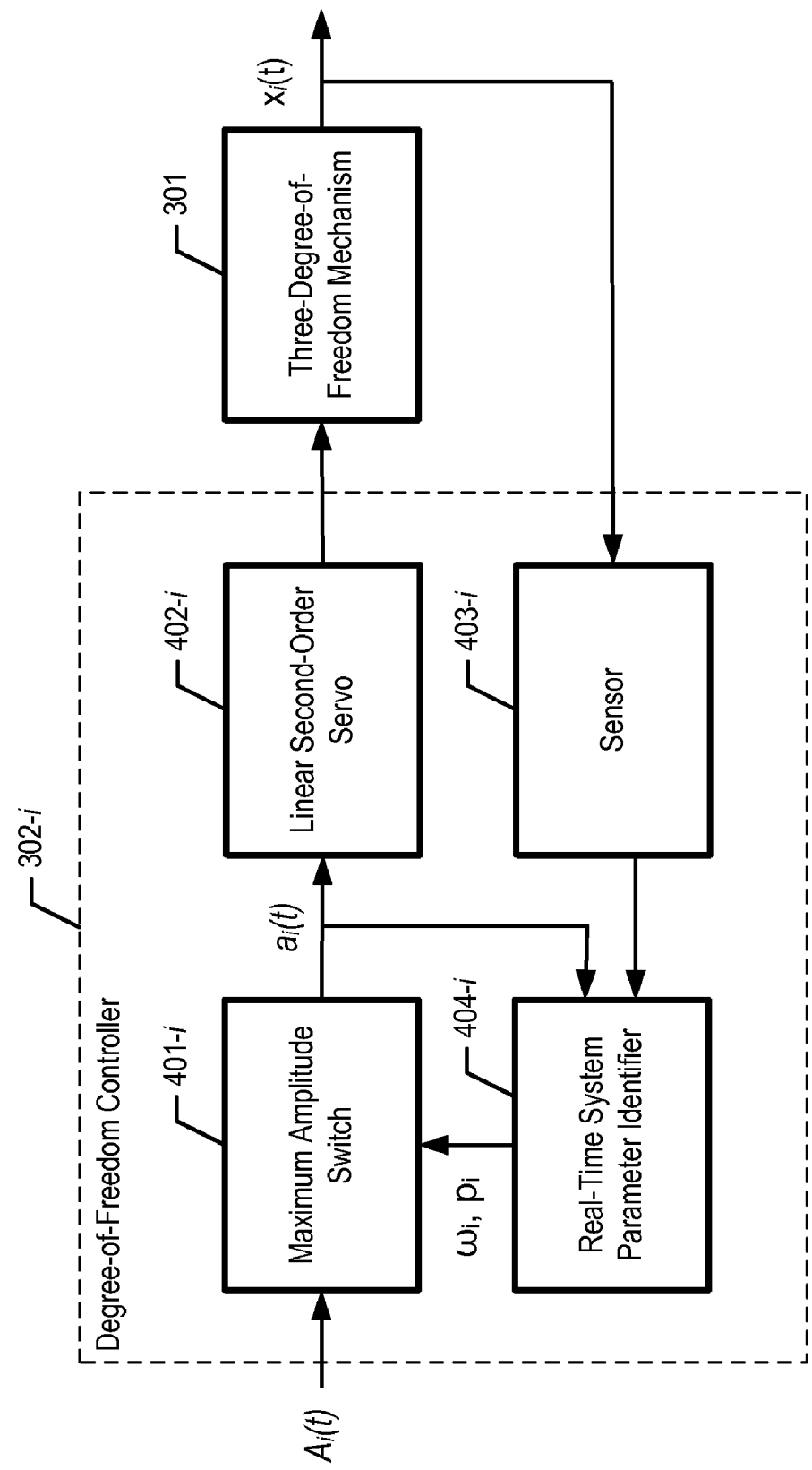
FIG. 4 depicts a block diagram of degree-of-freedom controller 302-i, as depicted in FIG. 3.

FIG. 4 depicts a block diagram of degree-of-freedom controller 302-i, as depicted in FIG. 3. Degree-of-freedom controller 302-i is an closed-loop control system that comprises: maximum-amplitude switch 401-i, linear second-order servo 402-i, sensor 403-i, and real-time system parameter identifier 404-i, interrelated as shown.

Maximum-amplitude switch 401-i is identical to maximum-amplitude switch 201-i in the prior art, and takes as input:
i. the signal $A_i(t)$,
ii. a signal $p_i$, which is the damping ratio of degree of freedom i of mechanism 101, and
iii. a signal $w_i$, which is the frequency of degree of freedom i of mechanism 101. Maximum-amplitude switch 401-i takes these three values and generates a time-varying output signal $a_i(t)$, which is the input to linear-second-order servo 402-i. It will be clear to those skilled in the art how to generate $a_i(t)$ given $A_i(t)$, $p_i$, and $w_1$. See, for example, J. H. Fu, U.S. Pat. No. 6,611,119. In accordance with the illustrative embodiment, maximum-amplitude switch 201 feeds the signal $a_i(t)$ to real-time system parameter identifier 205 for periodic instants $s_{n-1}, s_{n-2}, s_n, s_{n+1}, s_{n+2}$, etc., which are designed by $a_{n-1}, a_{n-2}, a_n, a_{n+1}, a_{n+2}$, etc., wherein n is an integer.

Linear second-order servo 202 is identical to linear second-order servo 102 in the prior art, and also receives $a_i(t)$ and generates output a time-varying output $x_i(t)$, which drives one degree of freedom of mechanism 203, in well-known fashion. It will be clear to those skilled in the art how to make and use linear second-order servo 202.

Mechanism 203 is a mechanism with one degree of freedom, as in the prior art. It will be clear to those skilled in the art, however, after reading this disclosure, how to make and use alternative embodiments of the present invention that have any number of degrees of freedom. In those cases, there is a set of maximum-amplitude switch, linear second-order servo, sensor, and real-time system parameter identifier for each degree of freedom.

Sensor 204 continually samples $x_i(t)$ and continually provides real-time system parameter identifier 205 with real-time periodic estimates of the position and velocity of $x_i(t)$. It will be clear to those skilled in the art how to make and use sensor 204. In accordance with the illustrative embodiment of the present invention, the sampling rate—designated f—is much higher than the switching rate of maximum-amplitude switch 201.

In accordance with the illustrative embodiment, the consecutive estimates of the position and velocity of $x_i(t)$ are provided for instants $s_{n-1}, s_{n-2}, s_n, s_{n+1}, s_{n+2}$, etc., and the corresponding estimates of the position and velocity are designed by $x_{n-1}, x_{n-2}, x_n, x_{n+1}, x_{n+2}$, etc. and $y_{n-1}, y_{n-2}, y_n, y_{n+1}, y_{n+2}$, etc., respectively. Table 1 depicts the time correlation of five consecutive instants and the corresponding values for the signal $a_i(t)$, the velocity of $x_i(t)$, $x'_i(t)$, and the position of $x_i(t)$.

TABLE 1

Time Correlation of s(t), $a_i(t)$, $x'_i(t)$, and $x_i(t)$

| $s_i(t)$ | $a_i(t)$ | $x'_i(t)$ | $x_i(t)$ |
|---|---|---|---|
| $s_0$ | $a_0$ | $y_0$ | $x_0$ |
| $s_1$ | $a_1$ | $y_1$ | $x_1$ |
| $s_2$ | $a_2$ | $y_2$ | $x_2$ |
| $s_3$ | $a_3$ | $y_3$ | $x_3$ |
| $s_4$ | $a_4$ | $y_4$ | $x_4$ |

Real-time system parameter identifier 205 takes as input:
i. the signal $a_i(t)$ output from maximum-amplitude switch 201,
ii. the estimates of position $x_{n-1}, x_{n-2}, x_n, x_{n+1}, x_{n+2}$, etc., provided by sensor 204, and
iii. the estimates of velocity $y_{n-1}, y_{n-2}, y_n, y_{n+1}, y_{n+2}$, etc., provided by sensor 204 and continually regenerates estimates for the values of $p_i$ and $w_i$. When $A_1(t)$ is constant, the values of $p_i$ and $w_i$ are generated in accordance with Equations (1) and (2):

$$\omega_i = \sqrt{\frac{y_1^2 - y_0 y_2}{|A_{max}|(y_1 - y_0) + x_1 y_0 - x_0 y_1}} \quad \text{(Eq. 1)}$$

and $$p_i = \frac{f}{2\omega} \frac{|A_{max}|(2y_1 - y_0 - y_2) + x_0(y_2 - y_1) - x_1(y_1 - y_0)}{|A_{max}|(y_1 - y_0) + x_1 y_0 - x_0 y_1} \quad \text{(Eq. 2)}$$

where $|A_{max}|$ is the maximum output of the maximum-amplitude switch, and $f=1$/sampling rate (i.e., $f=1/(s_1-s_0)$).

To suppress the transients in $x_i(t)$, maximum-amplitude switch 401-i outputs one value ($+A_{max}$) for one interval from $t_B$ to $t_S$ and outputs a second value ($-A_{max}$) for a second interval from $t_S$ to $t_E$. In solving for $t_S$ and $t_E$, maximum-amplitude switch 401-i solves two simultaneous algebraic equations for the two unknown time intervals ($t_S$-$t_B$) and ($t_E$-$t_S$):

$$x(t_E)=x_p(t_E) \quad \text{(Eq. 3)}$$

$$x'(t_E)=x'_p(t_E) \quad \text{(Eq. 4)}$$

Equations (3) and (4) generalize the prior art in J. H. Fu, U.S. Pat. No. 6,611,119 in that Equations (3) and (4) teach the specification of this application that at the time $t_E$ the position and the velocity states of the mechanism must be equal to the intended or desired position and velocity states.

As in J. H. Fu, U.S. Pat. No. 6,611,119, Equations (3) and (4) can be derived as explicit algebraic equations by virtue of linearity of the control system model. Specifically, the algebraic expressions for the position and the velocity of the mechanism to be controlled can be given explicitly, given the initial (time $t_B$) position and velocity, at time $t_S$ as well as at time $t_E$.

This application recognizes and generalizes J. H. Fu, U.S. Pat. No. 6,611,119 as a special case that teaches driving the controlled mechanism to a fixed value servo command in minimum time without incurring the undesirable overshoots and undershoots by open-loop strictly time-based switching. In addition, this application teaches as an embodiment how to utilize the state data available from sensor(s).

In accordance with the illustrative embodiment, the values of $p_i$ and $w_i$ are regenerated once for each sample and within $s_n$-$s_{n-1}$ seconds of instant $s_n$.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:
1. An apparatus comprising:
   a linear second-order servo that drives one degree of freedom of a mechanism;
   a sensor for ascertaining the velocity and position of the degree of freedom of the mechanism at instant $s_0$, wherein the velocity at instant $s_0$ is represented by $y_0$ and wherein the position at instant $s_0$ is represented by $x_0$;

a real-time system parameter identifier for generating the damping ratio p and frequency ω of the one degree of freedom of the mechanism based on $x_0$ and $y_0$; and a maximum-amplitude switch for controlling the linear second-order servo based on the damping ratio p and frequency ω of the one degree of freedom of the mechanism.

2. The apparatus of claim 1 wherein the sensor also ascertains the velocity and position of the degree of freedom of the mechanism at instants $s_0$, $s_1$, and $s_2$;

wherein the velocity at instants $s_0$, $s_1$, and $s_2$ is represented by $y_0$, $y_1$, and $y_2$, respectively;

wherein the position at instants $s_0$ and $s_1$ is represented by $x_0$ and $x_1$, respectively;

wherein the real-time system parameter identifier generates the frequency ω based on $x_0$, $x_1$, $y_0$, $y_1$, $y_2$, and $A_{max}$; and wherein $|A_{max}|$ is the maximum output of the maximum-amplitude switch.

3. The apparatus of claim 2 wherein the real-time system parameter identifier generates the frequency ω based on:

$$\omega = \sqrt{\frac{y_1^2 - y_0 y_2}{|A_{max}|(y_1 - y_0) + x_1 y_0 - x_0 y_1}}.$$

4. The apparatus of claim 3 wherein the real-time system parameter identifier generates the damping ratio p based on:

$$p = \frac{f}{2\omega} \frac{|A_{max}|(2y_1 - y_0 - y_2) + x_0(y_2 - y_1) - x_1(y_1 - y_0)}{|A_{max}|(y_1 - y_0) + x_1 y_0 - x_0 y_1};$$

wherein f equals the sampling rate at which $y_0$, $y_1$, and $y_2$ are ascertained.

5. The apparatus of claim 2 wherein the real-time system parameter identifier generates the frequency ω based on:

$$\omega = \sqrt{\frac{y_1^2 - y_0 y_2}{[y_1(a_0 - x_0) - y_0(a_1 - x_1)]}};$$

wherein $a_0$ and $a_1$ are the output of the maximum-amplitude switch at instant $s_0$ and $s_1$, respectively.

6. The apparatus of claim 5 wherein the real-time system parameter identifier generates the damping ratio p based on:

$$p = \frac{f}{2\omega} \frac{y_0(a_1 - x_1) - 2y_2(a_1 - x_1) - y_2(a_0 - x_0)}{y_0(a_1 - x_1) - y_1(a_0 - x_0)};$$

wherein f equals the sampling rate at which $y_0$, $y_1$, and $y_2$ are ascertained.

7. The apparatus of claim 1 wherein the mechanism is a gun turret.

8. The apparatus of claim 1 wherein the mechanism is a antenna dish.

9. An apparatus comprising:

a mechanism comprising a first degree of freedom and a second degree of freedom;

a first linear second-order servo that drives the first degree of freedom of the mechanism;

a second linear second-order servo that drives the second degree of freedom of the mechanism;

a first sensor for ascertaining the velocity and position of the first degree of freedom of the mechanism at instant $s_0$, wherein the velocity at instant $s_0$ is represented by $y1_0$ and wherein the position at instant $s_0$ is represented by $x1_0$;

a second sensor for ascertaining the velocity and position of the second degree of freedom of the mechanism at instant $s_0$, wherein the velocity at instant $s_0$ is represented by $y2_0$ and wherein the position at instant $s_0$ is represented by $x2_0$;

a first real-time system parameter identifier for generating the damping ratio $p_1$ and frequency $\omega_1$ of the first degree of freedom of the mechanism based on $x1_0$ and $y1_0$;

a second real-time system parameter identifier for generating the damping ratio $p_2$ and frequency $\omega_2$ of the second degree of freedom of the mechanism based on $x2_0$ and $y2_0$;

a first maximum-amplitude switch for controlling the first linear second-order servo based on the damping ratio $p_1$ and frequency $\omega_1$ of the first degree of freedom of the mechanism; and a second maximum-amplitude switch for controlling the second linear second-order servo based on the damping ratio $p_2$ and frequency $\omega_2$ of the second degree of freedom of the mechanism.

10. The apparatus of claim 9 wherein the first sensor also ascertains the velocity and position of the first degree of freedom of the mechanism at instants $s_0$, $s_1$, and $s_2$;

wherein the velocity at instants $s_0$, $s_1$, and $s_2$ is represented by $y1_0$, $y1_1$, and $y1_2$, respectively;

wherein the position at instants $s_0$ and $s_1$ is represented by $x1_0$ and $x1_1$, respectively;

wherein the real-time system parameter identifier generates the frequency $\omega_1$ based on $x1_0$, $x1_1$, $y1_0$, $y1_1$, $y1_2$, and $A_{max}$; and wherein $|A_{max}|$ is the maximum output of the first maximum-amplitude switch.

11. The apparatus of claim 10 wherein the real-time system parameter identifier generates the frequency $\omega_1$ based on:

$$\omega_1 = \sqrt{\frac{y1_1^2 - y1_0 y1_2}{|A_{max}|(y1_1 - y1_0) + x1_1 y1_0 - x1_0 y1_1}}.$$

12. The apparatus of claim 11 wherein the real-time system parameter identifier generates the damping ratio $p_1$ based on:

$$p_1 = \frac{f}{2\omega} \frac{|A_{max}|(2y1_1 - y1_0 - y1_2) + x1_0(y1_2 - y1_1) - x1_1(y1_1 - y1_0)}{|A_{max}|(y1_1 - y1_0) + x1_1 y1_0 - x1_0 y1_1};$$

wherein f equals the sampling rate at which $y1_0$, $y1_1$, and $y1_2$ are ascertained.

13. The apparatus of claim 10 wherein the real-time system parameter identifier generates the frequency $\omega_1$ based on:

$$\omega_1 = \sqrt{\frac{y1_1^2 - y1_0 y1_2}{[y1_1(a1_0 - x1_0) - y1_0(a1_1 - x1_1)]}};$$

wherein $a1_0$ and $a1_1$ are the output of the maximum-amplitude switch at instant $s_0$ and $s_1$, respectively.

14. The apparatus of claim 13 wherein the real-time system parameter identifier generates the damping ratio $p_1$ based on:

$$p_1 = \frac{f}{2\omega} \frac{y1_0(a1_1 - x1_1) - 2y1_2(a1_1 - x1_1) - y1_2(a1_0 - x1_0)}{y1_0(a1_1 - x1_1) - y1_1(a1_0 - x1_0)};$$

wherein f equals the sampling rate at which $y1_0$, $y1_1$, and $y1_2$ are ascertained.

15. The apparatus of claim 9 wherein the mechanism is a gun turret.

16. The apparatus of claim 9 wherein the mechanism is a antenna dish.

* * * * *